(12) United States Patent
Ben-David et al.

(10) Patent No.: US 8,368,236 B2
(45) Date of Patent: Feb. 5, 2013

(54) SYSTEM AND METHOD FOR GENERATING AN ALTERNATING CURRENT OUTPUT SIGNAL

(76) Inventors: Rahamim Ben-David, Rehovot (IL); Dror Nadam, Eyn-Sarid (IL)

( * ) Notice: Subject to any disclaimer, the term of this patent is extended or adjusted under 35 U.S.C. 154(b) by 589 days.

(21) Appl. No.: 12/567,774

(22) Filed: Sep. 27, 2009

(65) Prior Publication Data

US 2010/0109324 A1   May 6, 2010

Related U.S. Application Data

(63) Continuation-in-part of application No. PCT/IL2008/000426, filed on Mar. 27, 2008.

(60) Provisional application No. 60/907,248, filed on Mar. 27, 2007.

(51) Int. Cl.
*H02K 7/20* (2006.01)
*H02P 9/04* (2006.01)

(52) U.S. Cl. ........................................ 290/8

(58) Field of Classification Search .......... 290/8, 10–12, 290/15
See application file for complete search history.

(56) References Cited

U.S. PATENT DOCUMENTS

| | | | | | |
|---|---|---|---|---|---|
| 5,083,039 | A | * | 1/1992 | Richardson et al. | 290/44 |
| 5,321,308 | A | * | 6/1994 | Johncock | 290/40 C |
| 5,541,483 | A | * | 7/1996 | Yang | 318/245 |
| 6,137,187 | A | * | 10/2000 | Mikhail et al. | 290/44 |
| 7,068,015 | B1 | * | 6/2006 | Feddersen | 322/89 |
| 2004/0119292 | A1 | * | 6/2004 | Datta et al. | 290/44 |
| 2004/0257050 | A1 | * | 12/2004 | Zeller | 322/47 |

* cited by examiner

*Primary Examiner* — Javaid Nasri
(74) *Attorney, Agent, or Firm* — Graeser Associates International Inc; Dvorah Graeser

(57) ABSTRACT

A system and device for providing AC signal. The system includes: an AC generator that outputs an AC output signal and includes an AC rotor that communicates with a shaft that is rotated at a rotation speed; a speed sensor for sensing the rotation speed; and a controller for controlling a magnetic field of the AC generator in response to the rotation speed; wherein the controller comprises a Field Exciter for providing a current to the AC generator so as to control the magnetic field of the AC generator.

32 Claims, 16 Drawing Sheets

| Output Voltage | 200Vac | 225Vac | 250Vac | 275Vac | 300Vac |
|---|---|---|---|---|---|
| RPM | Exciter's Control Voltage [Vdc] | | | | |
| 632 | 37.620 | | | | |
| 712 | 13.965 | 25.650 | | | |
| 792 | 9.833 | 13.110 | 22.230 | | |
| 872 | 6.840 | 9.006 | 12.730 | 19.950 | |
| 952 | 5.454 | 6.609 | 8.550 | 11.828 | 18.810 |
| 1032 | 4.458 | 5.281 | 6.538 | 8.550 | 12.730 |
| 1112 | 3.720 | 4.470 | 5.281 | 6.538 | 8.871 |
| 1192 | 3.173 | 3.797 | 4.521 | 5.320 | 6.508 |
| 1272 | 2.706 | 3.176 | 3.762 | 4.475 | 5.130 |
| 1352 | 2.334 | 2.787 | 3.330 | 3.827 | 4.506 |
| 1432 | 1.976 | 2.391 | 2.806 | 3.221 | 3.767 |
| 1565 | 0.855 | 1.710 | 0.718 | 1.094 | 2.736 |
| 1698 | -2.001 | -2.052 | -2.394 | 0.359 | 0.855 |
| 1831 | -2.394 | -2.702 | -3.591 | -4.275 | 0.359 |
| 1964 | -2.770 | -3.283 | -3.933 | -5.814 | -1.300 |
| 2097 | -3.300 | -4.104 | -4.685 | -6.737 | -3.146 |
| 2230 | -3.813 | -4.617 | -5.472 | -9.063 | -4.019 |
| 2363 | -4.617 | -5.472 | -7.045 | -12.654 | -4.720 |
| 2496 | -5.540 | -8.721 | -8.892 | -21.204 | -5.523 |

| total voltage [V] | normal voltage[V] | add voltage for hysteresis [V] | in algorithm | RPM | in algorithm |
|---|---|---|---|---|---|
| 1.80953125 | 1.79 | 0.01953125 | Y1 | 1400 | X1 |
| 1.284414063 | 1.26 | 0.024414063 | Y2 | 1515 | X2 |
| 0.892460938 | 0.87 | 0.022460938 | Y3 | 1616 | X3 |
| 0.53953125 | 0.52 | 0.01953125 | Y4 | 1695 | X4 |
| 0.396601563 | 0.38 | 0.016601563 | Y5 | 1843 | X5 |

SYSTEM AND METHOD FOR GENERATING AN ALTERNATING CURRENT OUTPUT SIGNAL

RELATED APPLICATIONS

This application claims priority as a Continuation-in-Part Application from PCT Application No. PCT/IL2008/000426, filed on Mar. 27, 2008, which claims priority from U.S. Provisional application 60/907,248, filed on Mar. 27, 2007, both of which are hereby incorporated by reference as if fully set forth herein.

FIELD OF THE PRESENT INVENTION

The present invention is related to a system and device for generating electricity according to a constant output yet with potentially variable speed, and in particular, to such a system and device which feature a voltage regulation system.

BACKGROUND OF THE PRESENT INVENTION

The generation of electricity through the use of electrical generators is important for modern life. These generators require some source of external energy to operate, which may for example be some type of fossil fuel and/or renewable energy. The generator then consumes the energy source in order to generate electricity. However, it is important that the power output remain constant in order for the generated electricity to be usable.

The power output can remain constant if the shaft speed of the generator remains constant. However, the shaft speed of the generator cannot always be held to a constant rate. Therefore, some generators have relied on maintaining at least a minimum speed, such that the power output provided is determined according to the minimum speed of the shaft. If the shaft speed increases beyond the minimum, the excess power produced is discarded and hence is wasted.

Various solutions have been attempted but none has completely solved the problem for alternating current (AC) generators. For example, U.S. Pat. No. 5,541,483 provides a method for controlling a direct current (DC) motor or generator, particularly those of the permanent magnet type. Due to functional differences between AC and DC generators, the described solution would not be operative for an AC generator.

US Patent Application No. 2004/0257050 describes a method and device for constant current generation, which attempts to overcome drawbacks associated with potentially variable shaft speed through controlling the current that is output by the generator, thereby achieving a constant level of output current. Therefore, the described invention relates to current stabilization which is relatively complex.

Various attempted solutions for achieving stabilized voltage output have included using inertia or friction as a mean of moderating the shaft speed fluctuations; using torque control in order to control the shaft speed; or converting the fluctuating AC electricity to DC electricity, and then converting it again into the standard grid AC power. Clearly all of these methods are very wasteful of energy.

In an effort to use sources of renewable energy, systems and devices have been introduced which use "natural" energy such as wind, through the use of wind turbines; sun, through the use of solar panels; water power, such as wave or tidal power; and the like. Wind energy may be particularly variable, given that wind tends to increase and decrease in power, and/or change direction, quite regularly. However, all of the "natural" energy sources may be expected to suffer from instability of power levels. Thus, for renewable energy, the ability to convert non-stable mechanical power to stable electrical power has major demand in a variety of applications.

Various solutions have been proposed in this area to overcome the instability of renewable energy sources, particularly with regard to wind generation. For example, U.S. Pat. No. 7,068,015 provides a solution for wind power by adjusting the magnetic field according to the rotation speed of the wind turbine according to feedback determined by measuring output voltage or current. US Patent Application No. 2004/0119292 provides a method for controlling the shaft speed of the generator by controlling its torque, a solution which is disadvantageous as noted above. The taught method further requires a diode rectifier for operation, which is another disadvantage.

U.S. Pat. No. 5,083,039 controls the power output by controlling the magnetic field of the generator, by controlling the stator current. However, changes to the stator current cause changes to the generator torque. In order to compensate for changes to the torque, the shaft speed is controlled by changing the pitch of the "wings" or blades of the turbine, which may be disadvantageous due to wind conditions, and which is disadvantageous in any case because it requires an additional expenditure of energy. U.S. Pat. No. 6,137,187 is similarly disadvantageous as it requires a pitch control system.

SUMMARY OF THE INVENTION

The term "constant electrical output" means an alternating current output signal that has a constant peak voltage.

The present invention provides a system and method for sensing a rotation speed of a shaft that rotates at a variable rotation speed and controlling the magnetic field of the AC generator in response to the sensed speed. The controlling includes utilizing a DC generator that supplies a current to the AC generator. This current determines the magnetic field of the AC generator. The magnetic field can be controlled in a manner that maintains a peak voltage of an output signal of the AC generator substantially constant despite changes in the rotation speed of the shaft.

The electro magnetic force induced by an AC generator is governed by Faraday's law:

$$EMF = \omega \times L \times B \times \sin(\theta)$$

In which:

EMF (electromagnetic field) is the output voltage. $\omega$ is the tangential speed of the winding.

L is the length of the winding that crosses the magnetic flux.

B is the magnetic field intensity.

$\sin(\theta)$ is the sin of the angle between the winding & the magnetic flux.

The above equation indicates that the peak voltage of an AC output signal of the AC generator is dependent on the shaft rotation speed, which in turn depends upon the mechanical power used to rotate the shaft. If the level of mechanical power is variable then the shaft rotation speed is in turn variable. However, even if the shaft rotation speed is variable, the peak voltage should be maintained substantially constant.

Therefore, the present invention does not require the shaft rotation speed to be constant, which is useful for a wide variety of applications, including but not limited to power generation by renewable energy or "natural" energy sources or any other energy source having variable output. Instead, according to embodiments of the present invention, the measurement of the shaft rotation speed is used to control the magnetic field intensity (B) through a feedback or control mechanism (that includes a DC generator) according to the speed of rotation of the shaft, thereby providing a constant voltage output and hence stable power generation.

According to embodiments of the present invention, control of the magnetic field intensity of the AC generator is preferably provided with a DC generator, featuring a rotor winding connected to the rotor winding of the AC generator. The rotation speed of the shaft of the AC generator is measured; according to this measurement, the operation of the DC generator is then used to increase or decrease the magnetic field intensity, thereby maintaining a constant voltage output even if the rotation speed of the shaft varies. The DC generator optionally and preferably has a separate power source. Preferably the amount of power required for management and control of the voltage output is relatively low as compared to the output of the generator itself; for example, tests described below indicated that the control power required was less than 30 W for a 5 KW generator. Optionally and preferably, the rotor winding of the DC generator is connected to the rotor winding of the AC generator, for controlling the magnetic field of the AC generator.

A system for providing an alternating current (AC) output signal, the system includes: an AC generator that outputs an AC output signal and comprises an AC rotor that communicates with a shaft that rotates at a rotation speed; a speed sensor for sensing the rotation speed; and a controller for controlling a magnetic field of the AC generator in response to the rotation speed; wherein the controller comprises a direct current (DC) generator that generates a current that is provided to the AC generator so as to control the magnetic field of the AC generator.

According to at least some embodiments, the DC generator includes a DC rotor that communicates with the shaft.

According to at least some embodiments, the DC rotor is connected to the AC rotor.

According to at least some embodiments, the DC rotor is connected to the AC rotor by rigid wiring.

According to at least some embodiments, the DC generator comprises a DC stator that if fed by an excitation voltage that has an amplitude that is responsive to the rotation speed.

According to at least some embodiments, the controller includes a voltage regulation system that receives rotation speed information from the speed sensor and determines an amplitude of an excitation voltage to be provided to the DC generator.

According to at least some embodiments, the voltage regulation system determines the amplitude of the excitation voltage in response to a relationship between the rotation speed and a peak voltage of the AC output voltage.

According to at least some embodiments, the voltage regulation system includes: an analog to digital converter that converts analog rotation speed information to digital rotation speed information; a low pass filter for filtering the digital rotation speed information to provide filtered rotation speed information; a processor, for determining the excitation voltage in response to the filtered digital rotation speed information and to a relationship between the rotation speed and a peak voltage of the AC output voltage; and a digital to analog converter, for converting a digital control signal outputted from the processor to an analog control signal that controls the amplitude of the excitation voltage.

According to at least some embodiments, the system includes a speed sensor that generated digital rotation speed information.

According to at least some embodiments, the controller includes a voltage regulation system that receives rotation speed information from the speed sensor and a requested peak voltage of the AC output signal and determines an amplitude of an excitation voltage to be provided to the DC generator.

According to at least some embodiments, the shaft is rotated by a mechanical input element that is powered by a renewable energy source.

According to at least some embodiments, the renewable energy is selected from a group consisting of wind, water, solar and geothermal.

According to at least some embodiments, the system further includes a mechanical input element that rotates the rotor.

According to at least some embodiments, the system further includes a cooling fan that communicates with the shaft.

According to at least some embodiments, the controller controls the magnetic field of the AC generator so as to maintain a peak voltage of the AC output substantially constant despite changes in the rotation speed.

Unless otherwise defined, all technical and scientific terms used herein have the same meaning as commonly understood by one of ordinary skill in the art to which this invention belongs. The materials, methods, and examples provided herein are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A is of an exemplary, illustrative method according to the present invention for control of the operation of the generator of FIG. 1A, while

FIGS. 9 and 10 illustrate the relationships between control current and rotation speed of the shaft for different values of the peak voltage of the AC output signal;

FIG. 14 shows some of the voltage/RPM values obtained in a tested system using the method of FIG. 13.

DESCRIPTION OF THE VARIOUS EMBODIMENTS

The present invention is of a system and device for providing constant voltage power (meaning—an alternating current output signal that has a substantially constant peak voltage) by an AC generator, through control of the magnetic field intensity of the AC generator, wherein the control utilizes a DC generator. The magnetic field intensity is controlled by a current supplied by the DC generator and according to the rotation speed of the shaft of the AC generator, such that variations of the rotation speed of the shaft are compensated by changes to the magnetic field intensity.

According to embodiments of the present invention, the DC generator, featuring a rotor winding electrically connected to the rotor winding of the AC generator. The rotation speed of the shaft of the AC generator is preferably measured; according to this measurement, the operation of the DC generator is then used to increase or decrease the magnetic field intensity, thereby maintaining a constant voltage output even if the rotation speed of the shaft varies.

Optionally and preferably, the rotor winding of the DC generator is connected to the rotor winding of the AC generator, for controlling the magnetic field of the AC generator.

The present invention may optionally be used with any type of mechanical power source, but is useful with regard to any mechanical power input source which is characterized by variability. Examples of such mechanical power input sources include but are not limited to any type of renewable or "natural" energy source, including but not limited to wind, water, solar or geothermal.

According to optional embodiments of the present invention, rather than providing a constant voltage output, optionally the magnetic field of the AC generator is controlled according to some criterion, such as a set point for example. The set point may optionally be a minimal required set point or a maximal permitted set point for the voltage output, and/or a within a range of permitted set point values.

The principles and operation of the present invention may be better understood with reference to the drawings and the accompanying description.

Figure 1A:
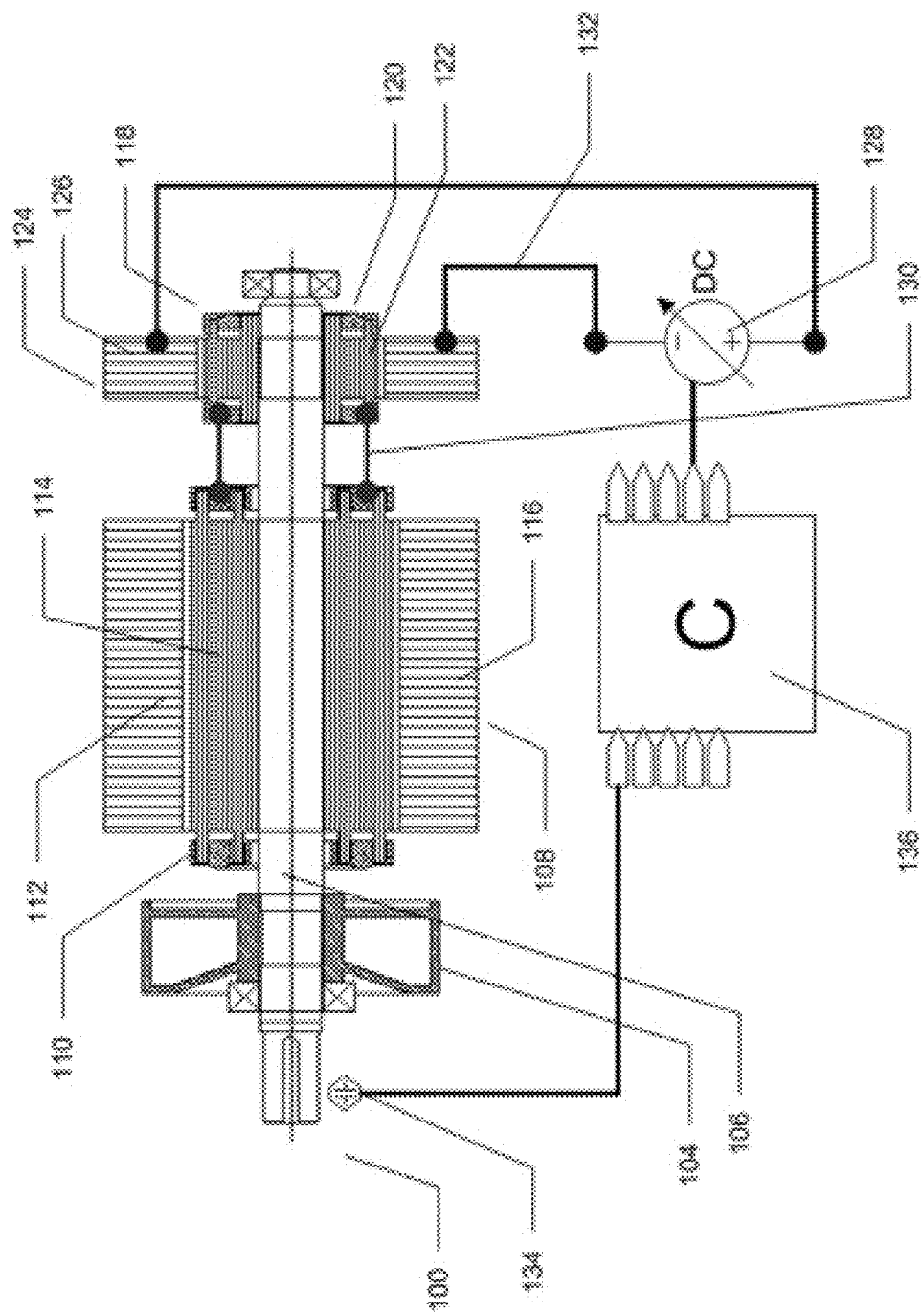
FIGS. 1A and 1B are of exemplary, illustrative AC generator systems according to various embodiments of the present invention.
Figure 1B:
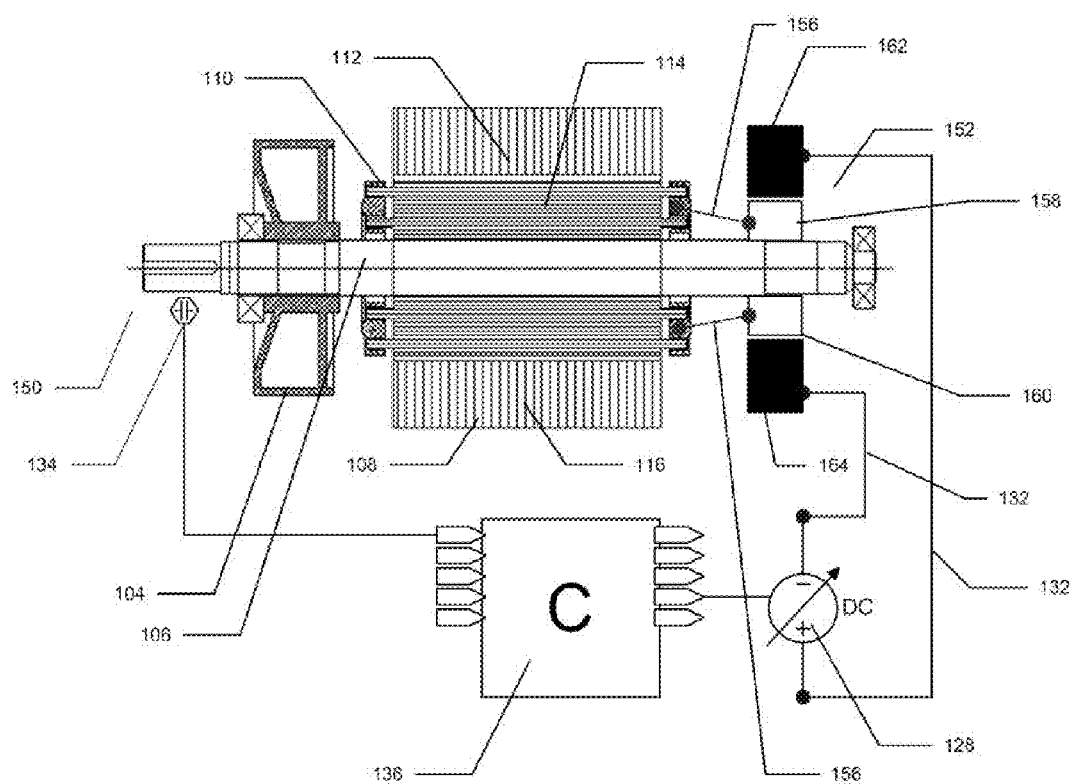

Referring now to the drawings, FIGS. 1A and 1B are of exemplary, illustrative AC generator systems according to various embodiments of the present invention. FIG. 1A shows an exemplary generator system which is brushless according to at least some embodiments of the present invention, while FIG. 1B shows a corresponding exemplary generator system with brushes according to at least some embodiments of the present invention.

FIG. 1A is of an exemplary, illustrative AC generator system 100 for generating a constant level of output voltage. Generator system 100 features a connection to a mechanical power from a power source (not shown), which causes a shaft 106 of an AC generator 108 to rotate. Shaft 106 also optionally features a cooling fan 104 for cooling the operations of generator system 100. AC generator 108 is preferably a three phase, double winding generator, and features a rotor 110 and a stator 112. However, optionally AC generator 108 is a single phase generator (not shown). Rotor 110 preferably features rotor winding 114 while stator 112 preferably features stator winding 116.

An auxiliary DC generator 118 is provided as a non-limiting illustrative example of a Field Exciter; auxiliary DC generator 118 is optionally and preferably installed onto shaft 106 as shown, for controlling the intensity of the magnetic field of AC generator 108. DC generator 118 features a DC rotor 120 with DC rotor winding 122, and a DC stator 124 with DC stator winding 126. DC rotor winding 122 is preferably connected to rotor winding 114 of AC generator 108 through a connector 130, which preferably comprises some type of wiring, which may optionally be rigid wiring as DC rotor winding 122 rotates at the same speed as rotor winding 114. DC stator winding 126 is connected to a DC power source 128 through a suitable connector 132 as is known in the art.

A rotation speed sensor (also referred to as speed sensor) 134 is preferably connected to shaft 106, for sensing the speed of rotation of shaft 106. Rotation speed sensor 134 may optionally feature any suitable speed sensing device, including but not limited to a shaft encoder, resolver, tachometer, a Hall effect sensor or any type of proximity sensor that reads the motion of a mark point on the perimeter of shaft 106. The mark point may be any type of marking, including but not limited to, a notch, screw or hole.

A voltage regulation system 136 is electrically connected to rotation speed sensor 134 and to DC power source 128. Voltage regulation system 136 is preferably PLC (programmable logic controller) based, although any type of programmable or computational device, or digital circuit, or any device featuring software, firmware or hardware, or a combination thereof, could also optionally be used.

AC generator system 100 preferably operates as follows. Mechanical power (not shown) is supplied to shaft 106 of AC generator 108, causing shaft 106 to rotate. An initial excitation voltage is induced on DC stator 124 by DC power source 128, causing DC rotor 120 to be subjected to an external magnetic field. DC power source 128 also causes DC rotor 120 to rotate. The combination creates an EMF in DC generator 118, thus current (also referred to as control current) flows from DC rotor 120 to rotor 110 of AC generator 108, thus creating a rotating magnetic field in rotor 110. As a result, an EMF is created in the output of AC generator 108 (ie AC generator 108 generates electricity).

Rotation speed sensor 134 senses the speed of rotation of shaft 106. This information is fed to voltage regulation system 136, which controls DC power source 128 in order to change the excitation voltage in DC stator 124, thereby changing the EMF output by DC generator 118. In turn, this controls the magnetic field intensity of AC generator 108, by changing the current in rotor winding 114.

FIG. 1B shows a similar exemplary, illustrative AC generator system 150 for generating a constant level of output voltage. Components having an identical or at least similar function as components in FIG. 1A are shown with the same reference numbers.

AC generator system 150 differs from that shown in FIG. 1A as follows. A brushes mechanism 152 is provided in place of auxiliary DC generator 118 as shown as another illustrative, non-limiting example of a Field Exciter. Brushes mechanism 152 optionally and preferably features conductive rings 158 and 160 connected to the rotor shaft 106, and conductive brushes 162 and 164. Brushes 162 and 164 are preferably also low friction; for example brushes 162 and 164 optionally comprise a low friction conductive material, such as graphite for example, and/or ceramics or composite materials. Conductive rings 158 and 160 are preferably connected to rotor winding 114 of AC generator 108 through a connector 156, which preferably comprises some type of wiring, which may optionally be rigid wiring as described above with regard to FIG. 1A. Conductive rings 158 and 160 rotate at the same speed as rotor winding 114.

The low friction brushes 162 and 164 are preferably connected to DC power source 128 through a suitable connector 132 as is known in the art and as described above with regard to FIG. 1A.

AC generator system 150 preferably operates as follows. Mechanical power (not shown) is supplied to shaft 106 of AC generator 108, causing shaft 106 to rotate. An initial excitation voltage is induced on low friction brushes 162 and 164 by DC power source 128, causing low friction brushes 162 and 164 to conduct current to conductive rings 158 and 160. Conductive rings 158 and 160 are preferably attached to shaft 106, such that a magnetic field is induced between rotor winding 114 and stator winding 116.

The combination creates an EMF in brushes mechanism 152, thus current (also referred to as control current) flows from conductive rings 158 and 160 to rotor 110 of AC generator 108, thus creating a rotating magnetic field in rotor 110. As a result, an EMF is created in the output of AC generator 108 (ie AC generator 108 generates electricity).

Rotation speed sensor 134 senses the speed of rotation of shaft 106. This information is fed to voltage regulation system 136, which controls DC power source 128 in order to change the excitation voltage in low friction brushes 162 and 164, thereby changing the EMF output by brushes mechanism 152. In turn, this controls the magnetic field intensity of AC generator 108, by changing the current in rotor winding 114.

Figure 2A:
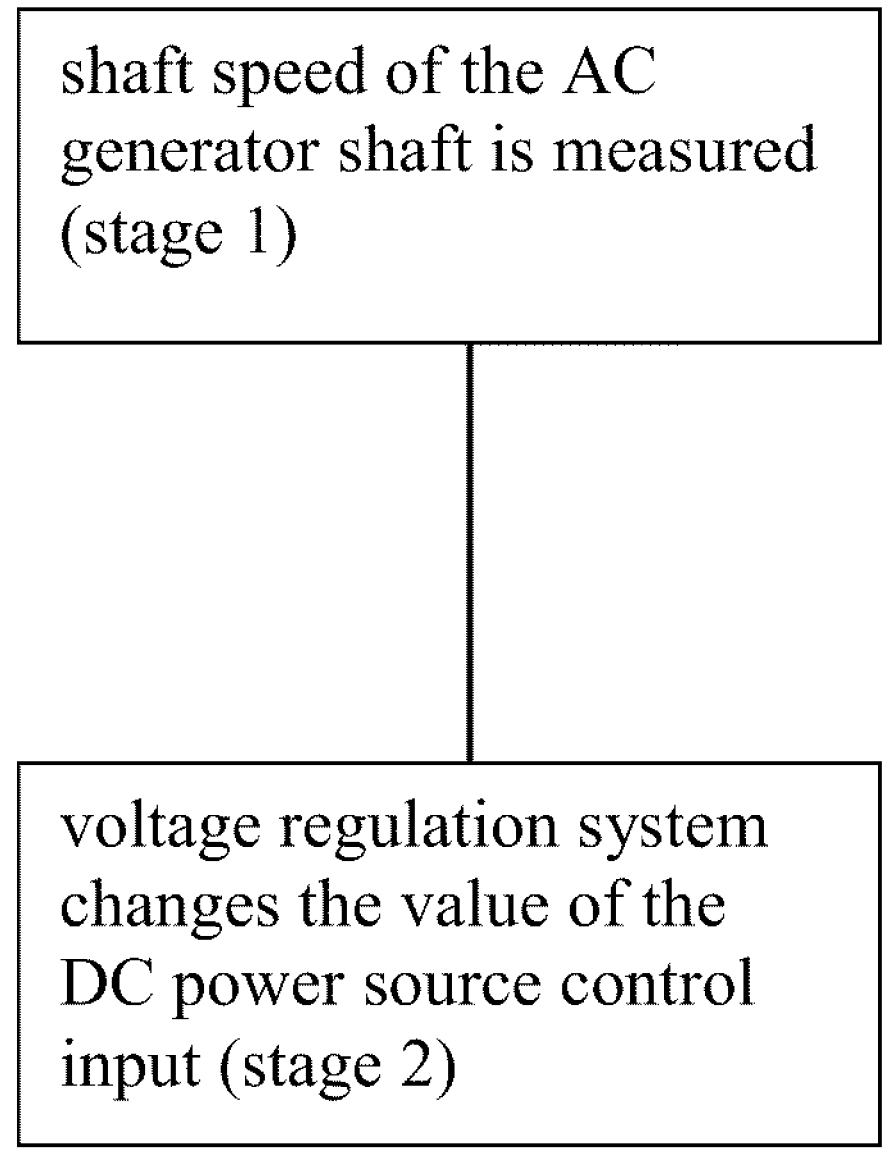
Figure 2B:
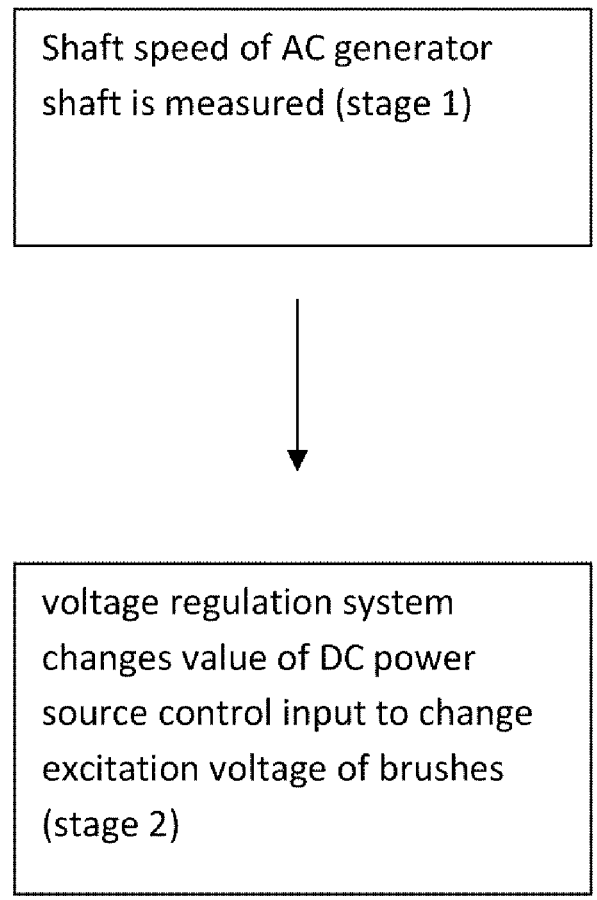
FIG. 2B is of an exemplary, illustrative method according to the present invention for control of the operation of the generator of FIG. 1B.

The excitation voltage is optionally and preferably determined by voltage regulation system 136 according to a method shown in FIGS. 2A and 2B. FIG. 2A is of an exemplary, illustrative method according to the present invention for control of the operation of the generator of FIG. 1A, while FIG. 2B is of an exemplary, illustrative method according to the present invention for control of the operation of the generator of FIG. 1B.

As shown in FIG. 2A, in stage 1, the actual rotation speed (also referred to as shaft speed) of the AC generator shaft is measured by the rotation speed sensor. In stage 2, the voltage regulation system changes the value of the DC power source control input, which preferably causes the excitation voltage of the DC stator to be changed. Stage 1 is then repeated at least once, although optionally and preferably both stages are repeated as needed.

As shown in FIG. 2B, in stage 1, the actual rotation speed (also referred to as shaft speed) of the AC generator shaft is measured by the rotation speed sensor. In stage 2, the voltage regulation system changes the value of the DC power source control input, which preferably causes the excitation voltage of the low friction brushes to be changed. Stage 1 is then repeated at least once, although optionally and preferably both stages are repeated as needed.

For the methods of both FIGS. 2A and 2B, optionally and preferably, initially the output voltage is measured in relation to the rotation speed in order to define the control voltage curve for a particular generator. Once this curve has been established for the generator, it is used for performing the above method.

The method may optionally also be used for changing the "set point" of the output signal of the AC generator. For example, such a method could optionally be used to increase or decrease the peak voltage of the output signal to be provided by the AC generator. Optionally, increasing or decreasing the peak voltage of the output signal could be useful under a variety of circumstances, for example if the level of input mechanical power to the AC generator were to change. As described in greater detail below, such changes of input mechanical power may occur with regard to any type of energy source, but may be particularly prevalent with regard to renewable energy sources such as wind power or other types of "natural" energy sources. Preferably, such increasing or decreasing the level of output voltage is performed for any mechanical power input source which is characterized by variability.

Figure 3:
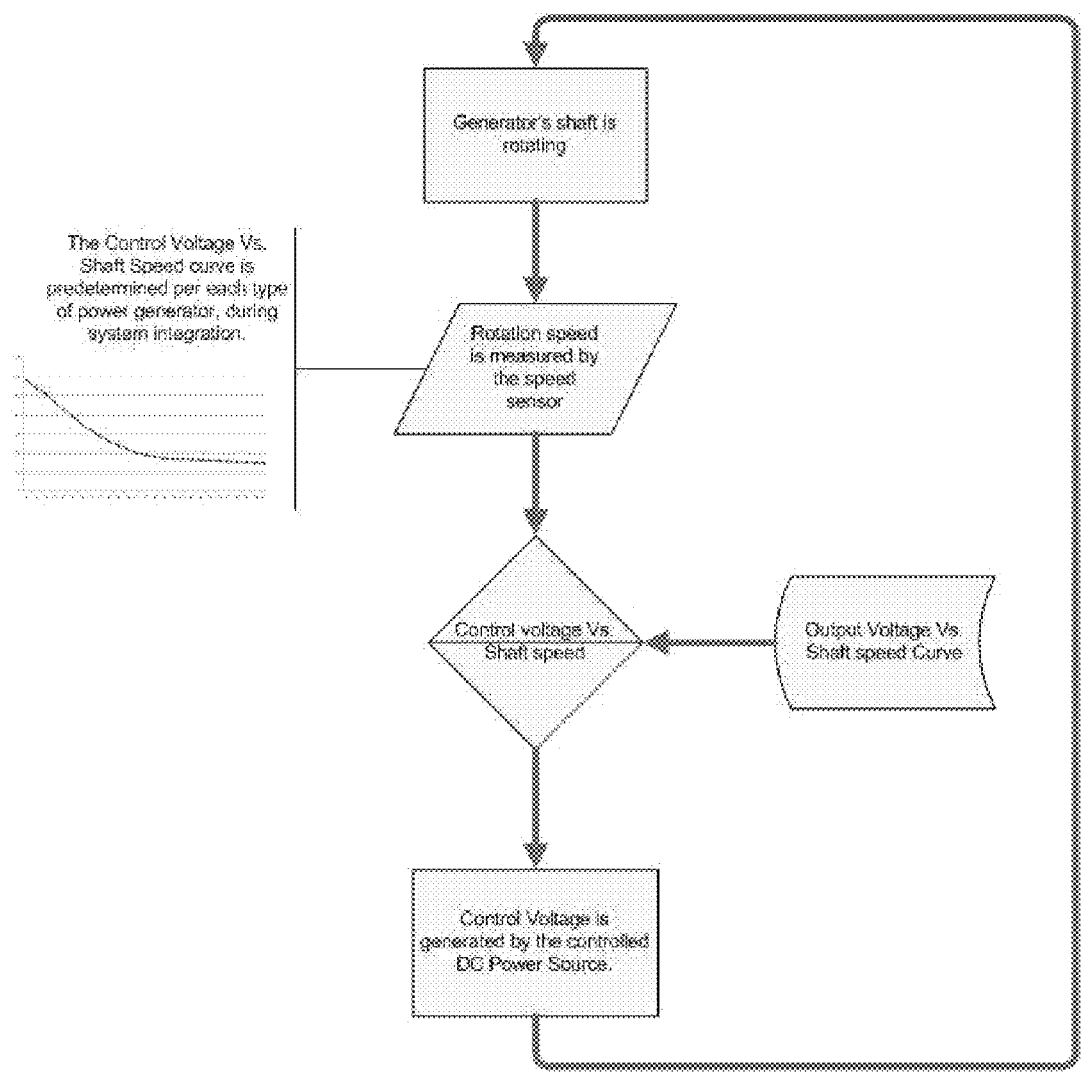
FIG. 3 is a more detailed but still schematic diagram of a voltage regulation system according to the present invention.

FIG. 3 is a more detailed but still schematic diagram of a voltage regulation system according to the present invention. In stage 1, as previously described, the control voltage curve is determined for each generator system, preferably during system integration. This stage is not necessarily repeated once the system is operational.

Stages 2-5 are preferably repeated at least once and are more preferably performed continuously as necessary, as a loop. In stage 2, the AC generator is operational and the AC generator's shaft is rotating. In stage 3, rotation speed of the shaft is measured by the rotation speed sensor as described in FIG. 1. In stage 4, using the rotation speed of the shaft and the control voltage curve, the amount of control voltage to be output is determined. In stage 5, the control voltage is output by the control voltage output generator, which as described in FIGS. 1A and 1B, is preferably an associated DC power source.

Figure 4:
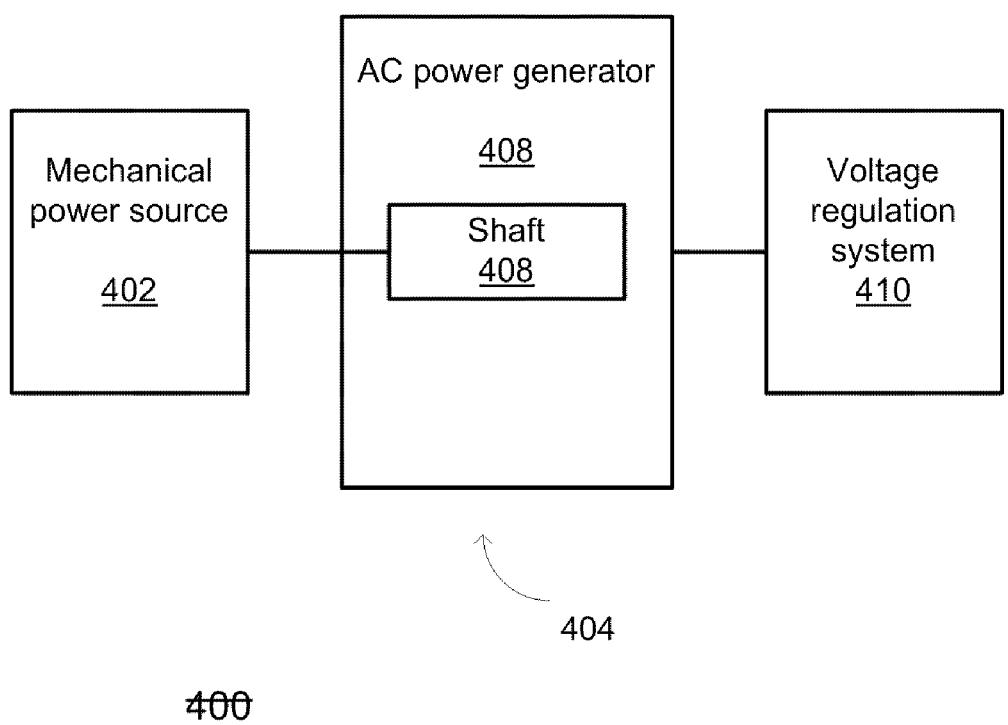
FIG. 4 is a schematic block diagram of an illustrative system according to the present invention for generation of a constant level of voltage by a generator that is at least partially powered by a renewable energy source or "natural" energy.

FIG. 4 is a schematic block diagram of an illustrative system according to the present invention for generation of a constant level of voltage by a generator that is at least partially powered by a renewable energy source or "natural" energy. As shown, a system 400 features a mechanical power source 402, which is preferably a device powered by some type of renewable energy source or "natural" energy, optionally and preferably selected from the group consisting of wind, solar, water and geothermal. System 400 also preferably features an AC generator system 404, which may for example be implemented as described with regard to FIGS. 1A and/or 1B and/or 2A and/or 2B and/or 3.

Mechanical power source 402 is mechanically connected to a shaft 406 of an AC generator 408 which is part of AC generator system 404, thereby causing shaft 406 to rotate. Mechanical power source 402 is optionally and preferably a variable power source, in the sense that the output level of mechanical power may optionally be variable. Such variation causes variation in the speed of rotation of shaft 406. However, a voltage regulation system 410 of AC generator system 404 controls the magnetic field in AC generator 408, such that AC generator system 404 provides an AC output signal that has a peak voltage that is maintained in a constant level, regardless of any variation of the speed of rotation of shaft 406.

Among the many advantages of the exemplary embodiment of the present invention shown in FIG. 4 is that the provision of a constant peak voltage of the AC output signal may be made without altering or affecting the structure or function of the wind, water (hydroelectric), solar, geothermal or other type of turbine. Therefore, the function and design of the turbine itself may be selected for most effective capture of energy from the renewable energy source. No background art reference teaches or suggests such a system or device for generating a constant level of output voltage from a renewable energy source.

EXAMPLE 1

Testing of An Illustrative System

This Example describes a test performed on an exemplary, illustrative non-limiting system according to the present invention. The system featured a hybrid, dual winding three phase generator as is known in the art, which includes both a DC generator and an AC generator, product number ECO3-254 (Mecc Alte S.p.A., Italy); and a voltage regulation system based on a CQM-45 (Omron Inc., USA) Programmable Logic Controller (PLC). The set point voltage of the system was 285 Vac. The AC generator was powered by an electric motor connected to a variable speed motor driver. The speed of rotation of the AC generator shaft was then altered according to the speed of the motor. For each rotation speed, the excitation voltage of the auxiliary DC generator was changed, until the peak voltage of the AC output reached the set point value (285 Vac).

Figure 5:
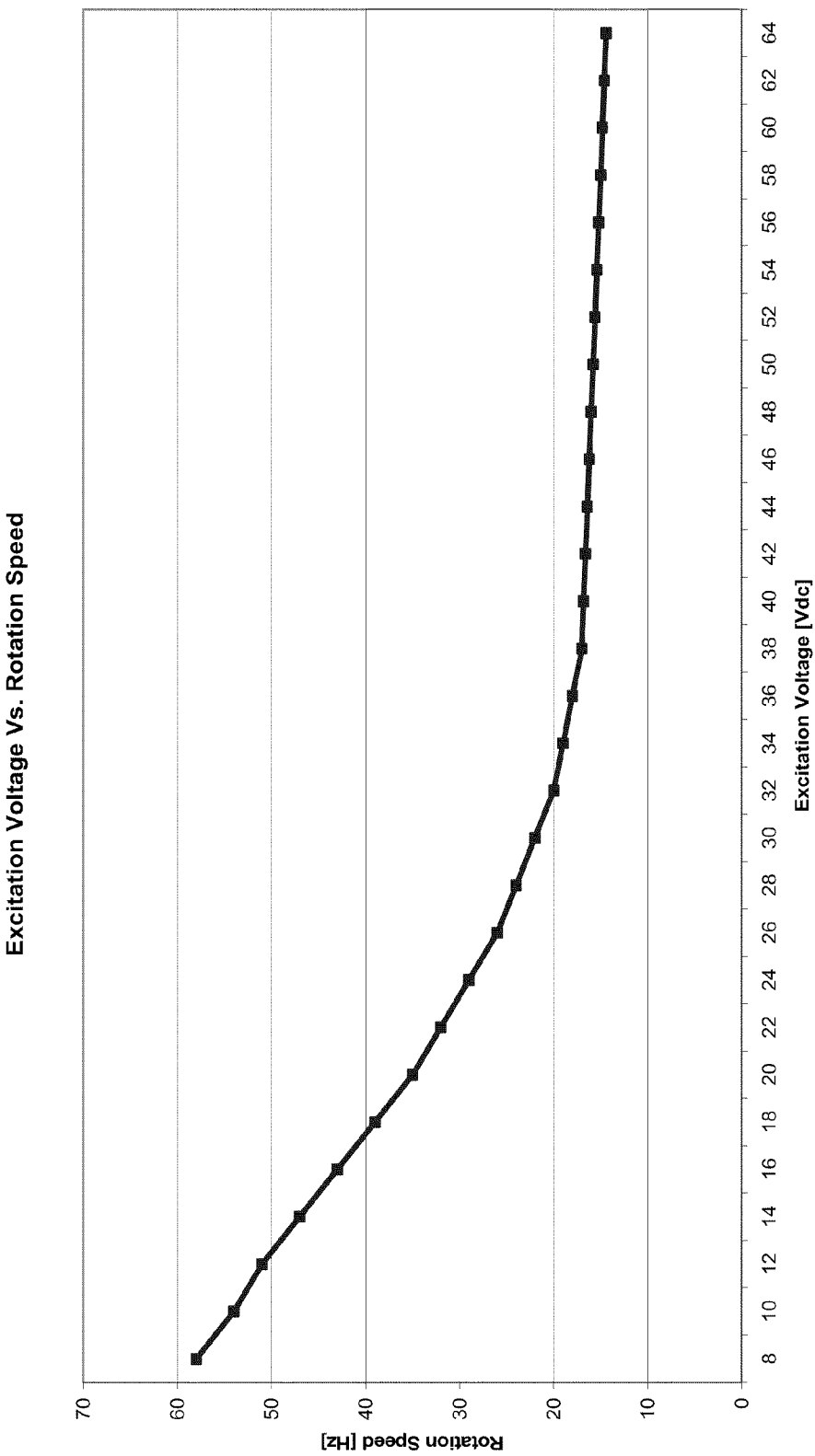
FIG. 5 shows results of a test of an exemplary system according to the present invention.

FIG. 5 shows the auxiliary excitation voltage values of the DC generator according to the speed of the shaft of the AC generator, as required to maintain a constant voltage output by the AC generator.

Figure 6:
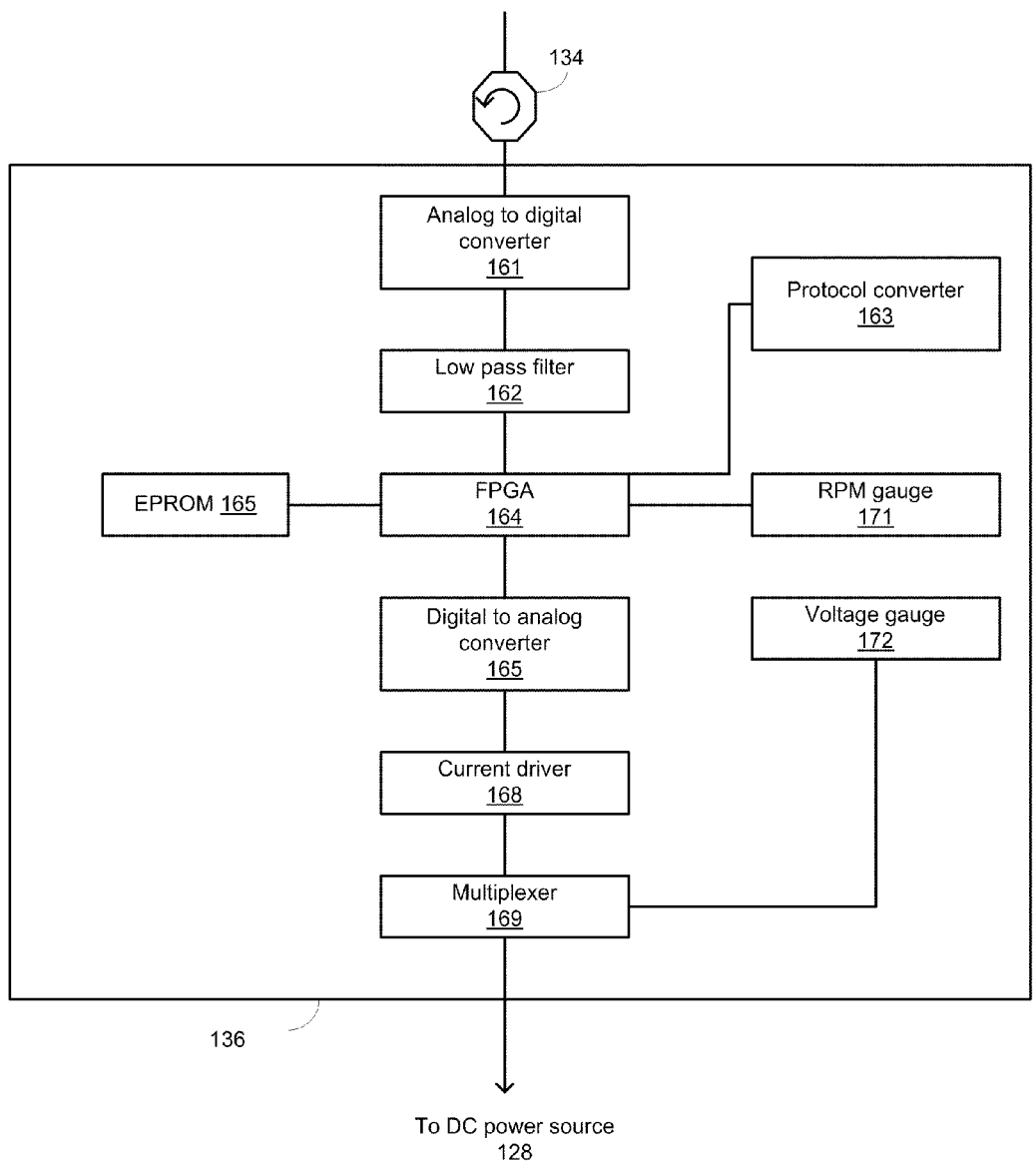
FIG. 6 illustrates in greater details a voltage regulation system and a rotation speed sensor, according to an embodiment of the invention.

FIG. 6 illustrates in greater detail voltage regulation system 136 and rotation speed sensor 134, according to an embodiment of the invention.

Rotation speed sensor 134 provides an analog rotation speed information to analog to digital converter 161 that converts the analog rotation speed information to digital rotation speed information. The digital rotation speed information is provided to low pass filter 162 that filters the digital rotation speed information to provide filtered rotation speed information. Low pass filter 162 can apply a Fast Fourier Transformation filtering process but this is not necessarily so.

Processor, such as FPGA 164 determines the excitation voltage in response to the filtered digital rotation speed information and to a relationship between the rotation speed and a peak voltage of the AC output voltage. Information representing this relationship can be stored in the FPGA, wherein instructions that are executed by FPGA can be stored in a memory unit such as EPROM 165.

Processor 164 outputs a digital control signal that represents the determination to digital to analog converter 166. Digital to analog converter 166 converts the digital control signal to an analog control signal that controls the amplitude of the excitation voltage. The analog control signal is fed to current driver 168 that provides a current signal that is provided to DC power source 128 and determines the excitation voltage outputted by power source 128. The signal outputted by current driver 168 or the analog control signal can be measured by voltage gauge 171 and displayed on a display of the voltage gauge. A multiplexer 169 or other sampling circuit can be provided between current driver 168 and the output port of voltage regulation system 136 in order to enable such a measurement as well as the provision of the current signal to DC power source 128.

According to at least some embodiments, digital to analog converter 166 includes a potentiometer that is used for determining the output range of the digital to analog converter 166, especially for allowing it to output a zero voltage analog control signal.

Protocol converter 163 or another port or interface can be used for providing to voltage regulation system 136 the required peak voltage.

Figure 8:
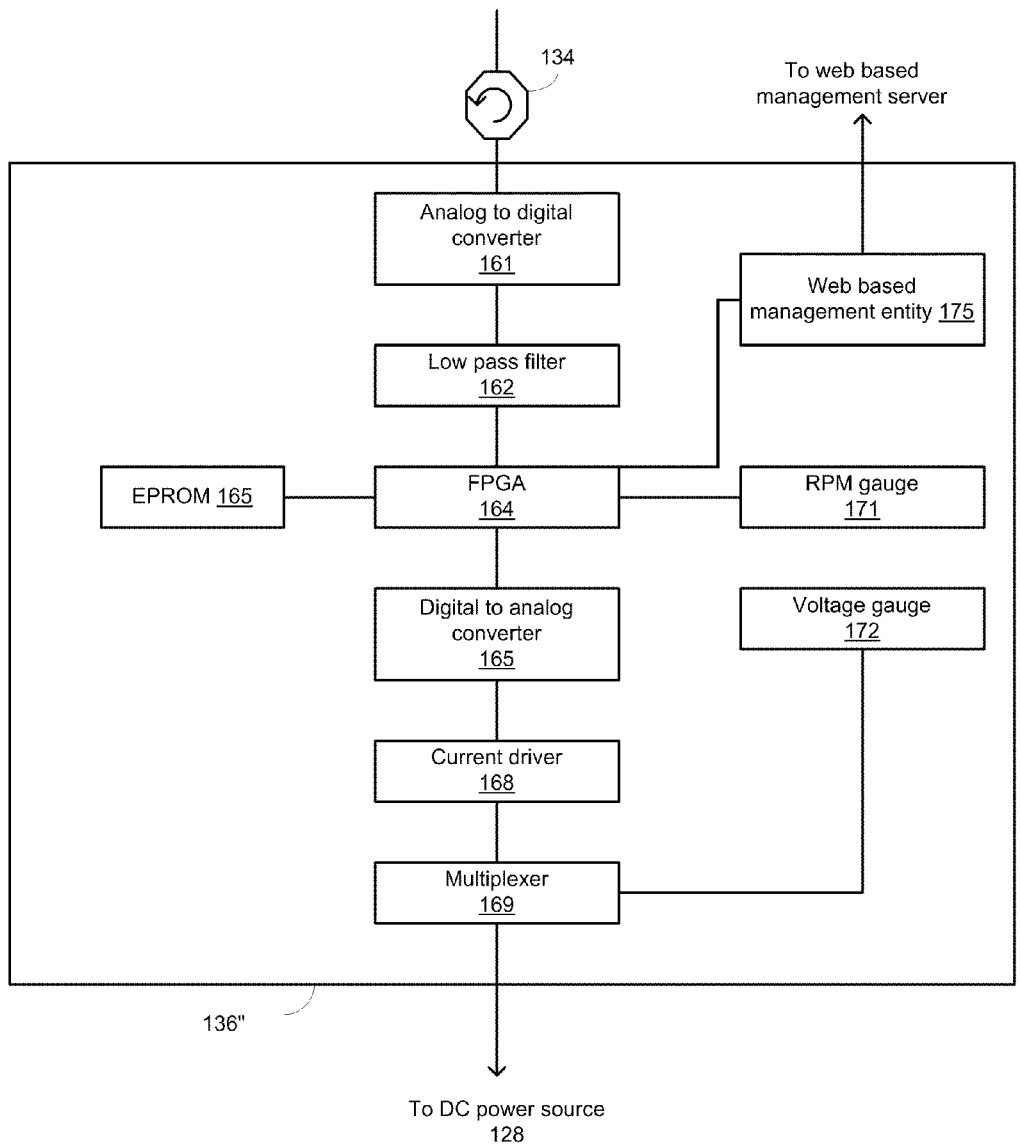
FIG. 8 illustrates in greater details a voltage regulation system and a rotation speed sensor, according to an embodiment of the invention.

A port or an interface (or an additional port or interface) can be used for providing web based management, as illustrated by FIG. 8. A web based management entity 175 of voltage regulation system 136 can permit data regarding rotation speed measurements and/or measurements of the analog signal outputted to DC power source 128 to be output to one or more external devices, and/or to permit one or more interactions of a user with the voltage regulation system 136. Web based management entity 175 can be software, firmware, hardware or a combination thereof.

Referring back to FIG. 6, voltage regulation system 136 can be mounted on a printed circuit board. Additionally or alternatively it can communicate with a web server (not shown) which can provide one or more web pages. These web pages act as an interface for the voltage regulation system 136 for the user, for example for simple configuration options, as is known in the art.

Voltage regulation system 136 can output information to a display such as rotation speed display 172 as well as to a display of voltage gauge 171 or a combination thereof. The information can be provided via a port or an interface.

Figure 7:
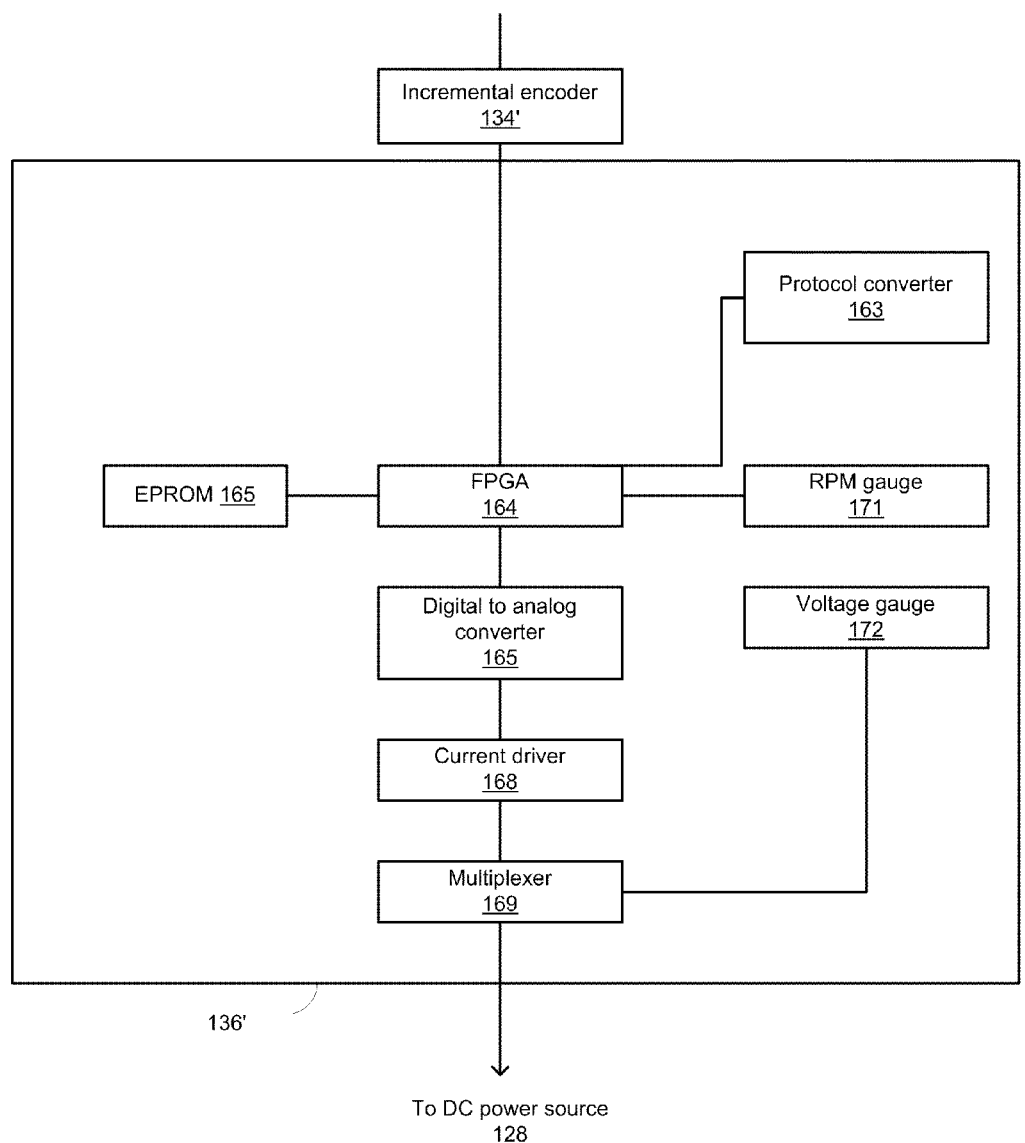
FIG. 7 illustrates in greater details a voltage regulation system and a rotation speed sensor, according to an embodiment of the invention.

According to another embodiment of the invention the rotation speed sensor provides digital rotation speed information and not an analog rotation speed information. FIG. 7 illustrates rotation speed sensor as including incremental encoder 134'. Incremental encoder 134' generates digital rotation speed information thus various components (such as analog to digital converter 161 and digital low pass filter 162) of voltage regulation system 136 are not required.

Figure 10:
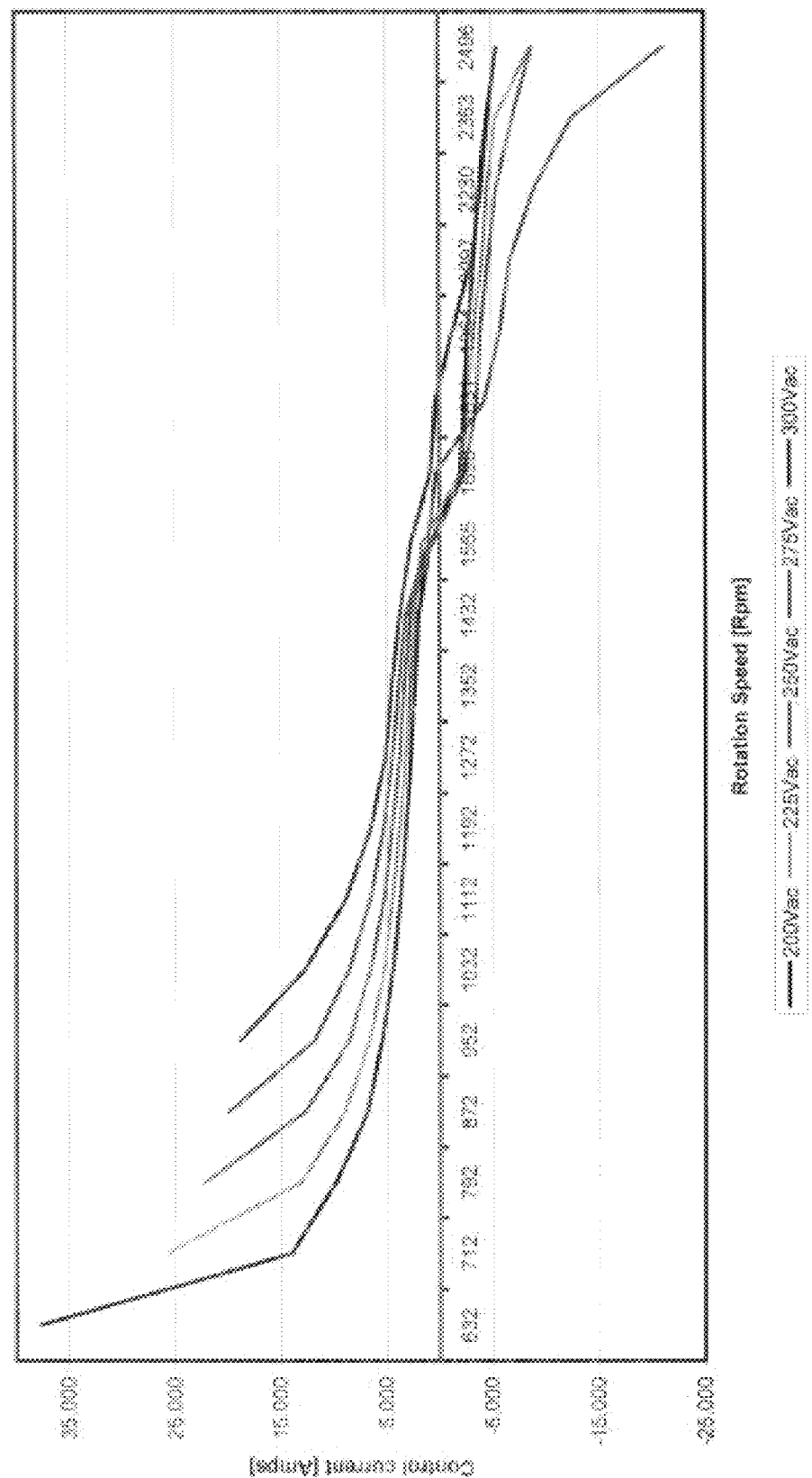

FIGS. 9 and 10 illustrate the relationships between control current and rotation speed of the shaft for different values of the peak voltage of the AC output signal, wherein the curves in FIG. 10 correspond to the values included in the table of FIG. 9.

Multiple curves represent the relationship between control current and rotation speed of the shaft for different peak voltages of the AC output signal.

Figure 11:
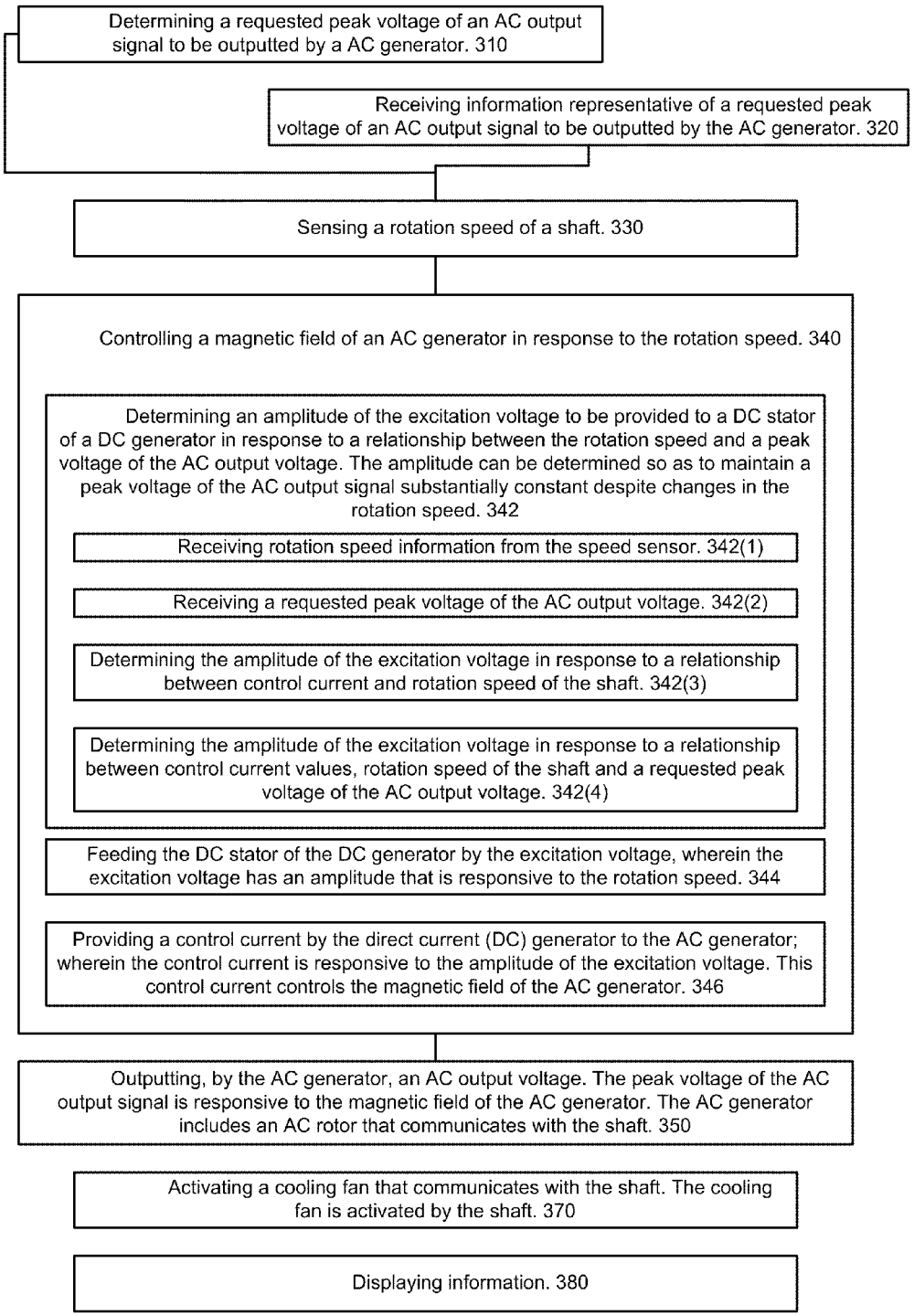
FIG. 11 illustrates an exemplary method according to an embodiment of the invention.

FIG. 11 illustrates method 300 according to an embodiment of the invention.

Method 300 starts by stage 310 or by stage 320.

Stage 310 includes determining a requested peak voltage of an AC output signal to be outputted by a AC generator.

Stage 320 includes receiving information representative of a requested peak voltage of an AC output signal to be outputted by the AC generator.

Stages 310 and 320 are followed by stage 330 of sensing a rotation speed of a shaft.

Method 300 can include rotating the shaft by a mechanical input element. This stage is not shown for simplicity of explanation. The shaft can be rotated by a mechanical input element that is powered by a renewable energy source. The renewable energy can be wind, water, solar or a geothermal energy source.

Stage 330 is followed by stage 340 of controlling a magnetic field of an AC generator in response to the rotation speed.

According to various embodiments of the invention, stage 340 can include at least one of the following stages or a combination thereof:

(i) Stage 342 of determining an amplitude of the excitation voltage to be provided to a DC stator of a DC generator in response to a relationship between the rotation speed and a peak voltage of the AC output voltage. The DC generator can have a DC rotor that communicates with the shaft. The DC rotor can be connected to the AC rotor, for example by rigid wiring. The amplitude can be determined so as to maintain a peak voltage of the AC output signal substantially constant despite changes in the rotation speed.

(ii) Stage 344 of feeding the DC stator of the DC generator by the excitation voltage, wherein the excitation voltage has an amplitude that is responsive to the rotation speed.

(i) Stage 346 of providing a control current by the direct current (DC) generator to the AC generator; wherein the control current is responsive to the amplitude of the excitation voltage. This control current controls the magnetic field of the AC generator.

Stage 340 is followed by stage 350 of outputting, by the AC generator, an AC output voltage. The peak voltage of the AC output signal is responsive to the magnetic field of the AC generator. The AC generator includes an AC rotor that communicates with the shaft.

Stage 342 of the determining can include at least one of the following stages or a combination thereof: (i) stage 342(1) of receiving rotation speed information from the speed sensor; (ii) stage 342(2) of receiving a requested peak voltage of the AC output voltage; and (iii) stage 342(3) of determining the amplitude of the excitation voltage in response to a relationship between control current and rotation speed of the shaft; (iv) stage 342(4) of determining the amplitude of the excitation voltage in response to a relationship between control current values, rotation speed of the shaft and a requested peak voltage of the AC output voltage.

It is noted that by changing the requested peak voltage of the AC output signal, the "set point" of the system is changed. When the peak voltage is changed the determination should select the relevant curve (or formula). Accordingly, stage 344 can involve selecting between curves such as those illustrated in FIG. 10.

According to an embodiment of the invention the determination is executed in the digital domain. Thus, stage 344 can include: (i) converting analog rotation speed information to digital rotation speed information; (ii) low pass filtering the digital rotation speed information to provide filtered rotation speed information; (iii) determining the excitation voltage in response to the filtered digital rotation speed information and to a relationship between the rotation speed and a peak voltage of the AC output voltage; (iv) generating a digital control signal that is responsive to the determining; and (v) converting the digital control signal to an analog signal that controls the amplitude of the excitation voltage.

Method 300 can also include stage 370 of activating a cooling fan that communicates with the shaft. The cooling fan is activated by the shaft. Method 300 can also include stage 380 of displaying information.

It is noted that the mentioned above system and method alter the magnetic field of the AC generator without measuring the current or voltage generated by the AC generator. There is no need to estimate the power outputted by the AC generator or to compare the estimated power to a reference power. This simplifies the control scheme.

EXAMPLE 2

Testing of An Illustrative System With Brushes

This Example describes a test performed on an exemplary, illustrative non-limiting system according to the present invention, according to an embodiment featuring a brushes mechanism as described above. The system featured a hybrid, dual winding three phase generator as is known in the art, which includes both a brushes mechanism and an AC generator, product number STC-3, 3 Kw 380V-Sphase generator, made by Fuan Lion Motor Co. Ltd., China; and a voltage regulation system based on a CQM-45 (Omron Inc., USA) Programmable Logic Controller (PLC). The set point voltage of the system was 285 Vac. The AC generator was powered by an electric motor connected to a variable speed motor driver. The speed of rotation of the AC generator shaft was then altered according to the speed of the motor. For each rotation speed, the excitation voltage of the brushes mechanism was changed, until the peak voltage of the AC output reached the set point value (285 Vac).

Figure 12:
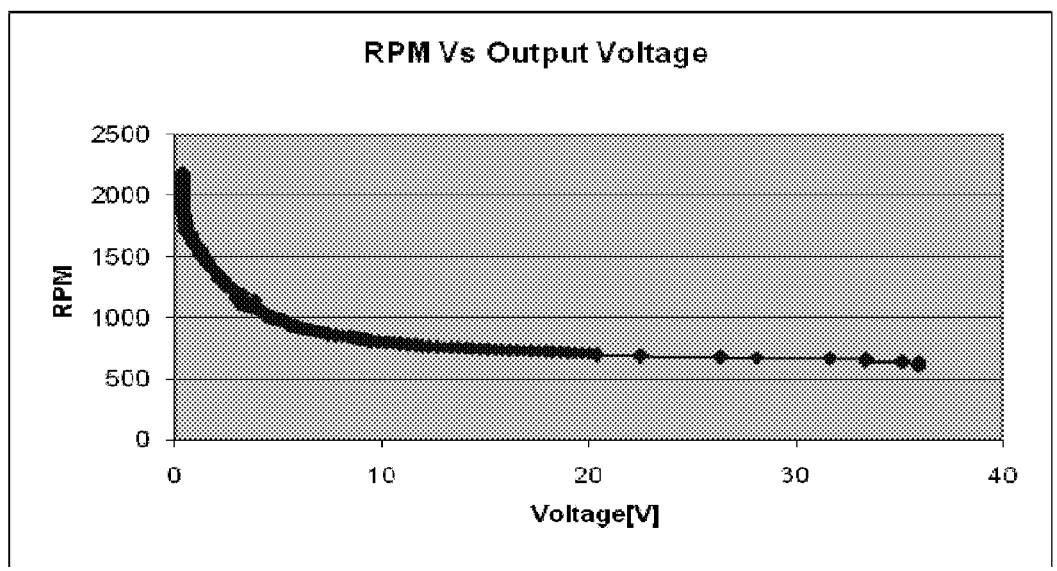
FIG. 12 shows the excitation voltage values of the brushes mechanism according to the speed of the shaft of the AC generator in RPM (rotations per minute), as required to maintain a constant voltage output by the AC generator.

FIG. 12 shows the excitation voltage values of the brushes mechanism according to the speed of the shaft of the AC generator in RPM (rotations per minute), as required to maintain a constant voltage output by the AC generator.

The voltage regulation system of FIGS. 6-8 may also optionally be used with this embodiment and so is not described further.

Figure 13:
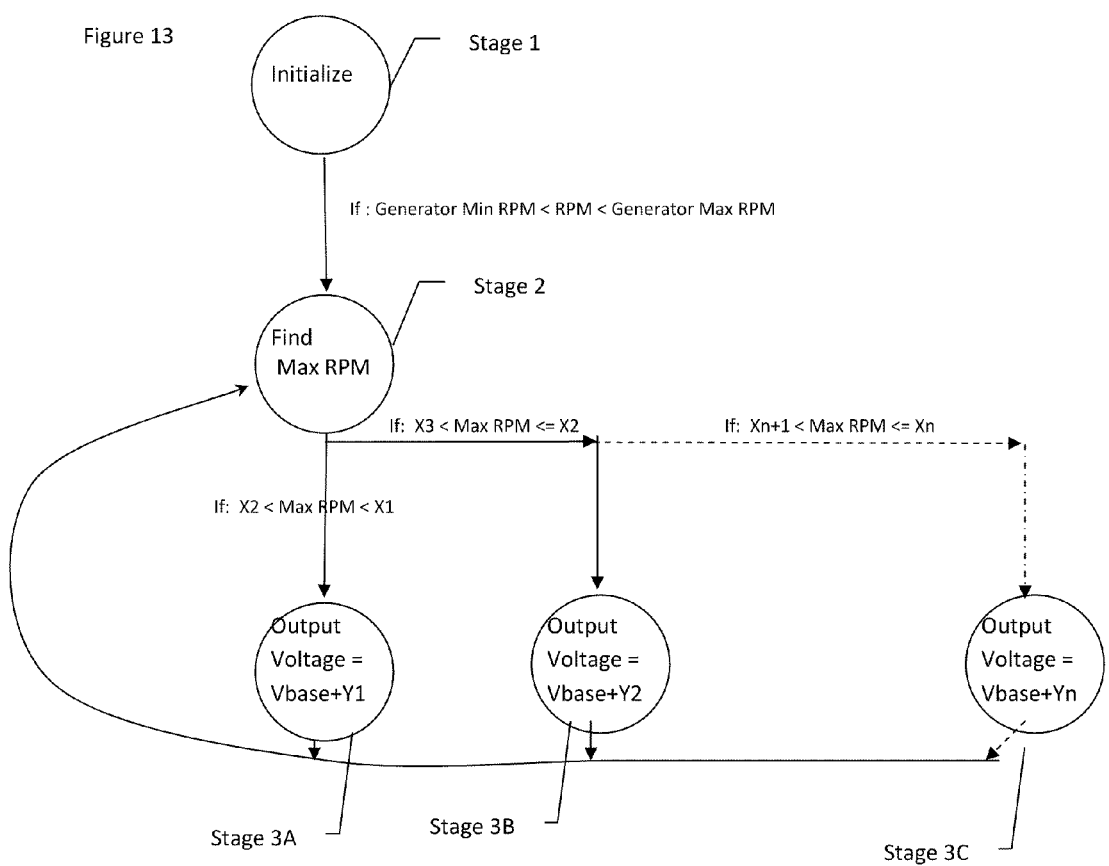
FIG. 13 shows an exemplary, non-limiting illustrative voltage control method according to at least some embodiments of the present invention.

FIG. 13 shows an exemplary, non-limiting illustrative voltage control method according to at least some embodiments of the present invention, which may optionally be used with the generator systems of either Examples 1 or 2, but which was tested on the system according to Example 2 (results provided below) and so is described with regard to this Example.

As shown, in stage 1, the system is initialized. It is assumed that the desired RPM at each rotation speed of the shaft will be between the maximum possible speed and the minimum possible speed (ie Generator Min RPM<RPM<Generator Max RPM). This stage preferably features calibration, for determining the values of X1, X2 . . . Xn for RPM of the shaft (described in greater detail below) and for determining the values of Y1, Y2 . . . Yn for voltage. In this case, the value of Xn is set so that Generator Min RPM<Xn and the value of X1 is set so that X1<Generator Max RPM. Y1 represents the corresponding voltage at X1, while Yn represents the corresponding voltage at Xn. The value of Vbase is also determined at calibration through a look-up table, in which corresponding voltage outputs for the field exciter are determined according to the RPM inputs, for values ranging from the maximum to the minimum RPM values for the generator.

Vbase is the value determined at calibration for a plurality of curves, each curve representing the degree of saturation of the generator at a particular local maximum. Each time the local maximum changes (that is, the maximum rotation speed reached during a period of continuous operation of the generator), a new curve is preferably selected from the calibration process. If the rotation speed drops below the local maximum, the Vbase curve selected according to the local maximum may still be used; however, once the rotation speed increases above the current value of the local maximum, a new local maximum (and hence a new Vbase curve) is preferably selected.

Therefore, the actual excitation voltage is preferably determined by at least two parameters: the basic Vbase curve (showing excitation voltage vs. rotation speed) that is preferably determined during the initial calibration process; and a correction voltage (Yn) which is preferably added to the basic Voltage according to the current local maximum speed of rotation.

The values of Yn are also preferably determined during the initial calibration process, as are the values of Xn, such that the EMF error is preferably lower than some desired threshold, such as +/−10% for example In stage 2, the process is initialized to find the current local maximum RPM value as described above and hence to determine the current curve for determining Yn. The process then continues to one of stages 3A, 3B or 3C, according to the measured RPM value for the shaft speed.

In stage 3A, it is determined that the measured RPM value, X2, is less than the maximum RPM value from stage 2, which in turn is smaller than the generator's maximum RPM value or X1:X2 <Max RPM<X1. In this case, the output voltage is equal to Vbase plus Y1, such that the previously determined curve is preferably used for the value of Yn, in this case Y1.

In stage 3B, it is determined that the measured RPM value, X2, is greater than or equal to the maximum RPM value from stage 2, which in turn is larger than X3 or X3<Max RPM<=X2. In this case, the output voltage is equal to Vbase plus Y2 as a new curve is used to select Yn—the Y2 curve.

In stage 3C, it is determined that the currently measured RPM value Xn is greater than or equal to the maximum RPM value from stage 2, which in turn is larger than Xn+1 or Xn+1<Max RPM<=Xn. In this case, the output voltage is equal to Vbase plus Yn, as the Yn curve is selected.

FIG. 14 shows some of the voltage/RPM values obtained in a tested system using the method of FIG. 13. The tested system was identical to that of FIG. 12. As shown, RPM values from 1400 to 1843 were tested; the corresponding added voltage values required are given as "add voltage for hysteresis [V]".

While the invention has been described with respect to a limited number of embodiments, it will be appreciated that many variations, modifications and other applications of the invention may be made.

What is claimed is:

1. A system for providing an alternating current (AC) voltage, the system comprising:
   an AC generator that outputs an AC output signal and comprises an AC rotor that communicates with a shaft that rotates at a rotation speed and an AC stator;
   a speed sensor for sensing the rotation speed; and
   a controller for controlling a magnetic field of the AC generator in response to the rotation speed, wherein the controller controls the magnetic field of the AC generator so as to maintain a peak voltage of the AC output signal substantially constant despite changes in the rotation speed;
   wherein the controller comprises a Field Exciter that provides a current that is provided to the AC generator so as to control the magnetic field of the AC generator;
   wherein the Field Exciter comprises a direct current (DC) generator that generates said current; wherein said DC generator comprises a DC rotor that communicates with the shaft and wherein the DC rotor is coupled to the AC rotor; wherein the DC generator comprises a DC stator that if fed by an excitation voltage that has an amplitude that is responsive to the rotation speed;
   the system further comprising a mechanical input element for rotating the shaft that is powered by a variable power source, said variable power source causing changes in the rotation speed of the shaft.

2. The system of claim 1 wherein the DC rotor is coupled to the AC rotor by rigid wiring.

3. The system of claim 1 wherein the controller comprises a voltage regulation system that receives rotation speed information from the speed sensor and determines an amplitude of an excitation voltage to be provided to the Field Exciter.

4. The system of claim 3 wherein the voltage regulation system determines that amplitude of the excitation voltage in response to a relationship between the rotation speed and a peak voltage of the AC output voltage.

5. The system of claim 3 wherein the voltage regulation system comprises:
   an analog to digital converter that converts analog rotation speed information to digital rotation speed information;
   a low pass filter for filtering the digital rotation speed information to provide filtered rotation speed information;
   a processor, for determining the excitation voltage in response to the filtered digital rotation speed information and to a relationship between the rotation speed and a peak voltage of the AC output voltage; and
   a digital to analog converter, for converting a digital control signal outputted from the processor to an analog signal that controls the amplitude of the excitation voltage.

6. The system of claim 1 wherein said speed sensor generates digital rotation speed information.

7. The system of claim 1 wherein the controller comprises a voltage regulation system that receives rotation speed information from the speed sensor and a requested peak voltage of the AC output signal and determines an amplitude of an excitation voltage to be provided to the Field Exciter.

8. The system of claim 1 wherein said variable power source comprises a renewable energy source.

9. The system of claim 8 wherein the renewable energy source is selected from a group consisting of wind, water, solar and geothermal.

10. The system of claim 1 further comprising a cooling fan that communicates with the shaft.

11. The system of claim 1 wherein the controller comprises a voltage regulation system that receives rotation speed information from the speed sensor and determines an amplitude of an excitation voltage to be provided to the Field Exciter.

12. A method for providing an alternating current (AC) voltage, the method comprising:
   rotating a shaft by a mechanical input element such that the shaft has variable rotation speed;
   sensing said rotation speed of a shaft;
   controlling a magnetic field of an AC generator in response to the rotation speed; wherein the controlling comprises providing a current by a Field Exciter to the AC generator; and
   outputting, by the AC generator, an AC output voltage; wherein a peak voltage of the AC output signal is responsive to the magnetic field of the AC generator;
   wherein the AC generator comprises an AC rotor that communicates with the shaft.

13. The method of claim 12, wherein said Field Exciter comprises a direct current (DC) generator.

14. The method of claim 13 wherein the controlling comprises providing the current by the DC generator; wherein the DC generator has a DC rotor that communicates with the shaft.

15. The method of claim 14 wherein the DC rotor is coupled to the AC rotor.

16. The method of claim 13 wherein the DC rotor of the DC generator is coupled to the AC rotor by rigid wiring.

17. The method of claim 13 comprising feeding a DC stator of the DC generator by an excitation voltage that has an amplitude that is responsive to the rotation speed.

18. The method of claim 12 comprising receiving rotation speed information from the speed sensor and determining an amplitude of an excitation voltage to be provided to the Field Exciter.

19. The method of claim 18 comprising determining the amplitude of the excitation voltage in response to a relationship between the rotation speed and a peak voltage of the AC output voltage.

20. The method of claim 18 comprising: converting analog rotation speed information to digital rotation speed information; low pass filtering the digital rotation speed information to provide filtered rotation speed information; determining the excitation voltage in response to the filtered digital rotation speed information and to a relationship between the rotation speed and a peak voltage of the AC output voltage; generating a digital control signal that is responsive to the determining; and converting the digital control signal to an analog signal that controls the amplitude of the excitation voltage.

21. The method of claim 20 comprising providing a digital rotation speed information by a rotation speed sensor.

22. The method of claim 20 comprising receiving rotation speed information from the speed sensor and a requested peak voltage of the AC output signal and determining an amplitude of an excitation voltage to be provided to the Field Exciter.

23. The method of claim 12 wherein said mechanical input element is powered by a renewable energy source.

24. The method of claim 12 wherein the renewable energy is selected from a group consisting of wind, water, solar and geothermal.

25. The method of claim 12 comprising activating a cooling fan that communicates with the shaft.

26. The method of claim 25 comprising feeding a DC stator of the DC generator by an excitation voltage that has an amplitude that is responsive to the rotation speed.

27. The method of claim 25 comprising receiving rotation speed information from the speed sensor and determining an amplitude of an excitation voltage to be provided to the DC generator.

28. The method of claim 12, wherein said Field Exciter comprises a brushes mechanism.

29. The method of claim 28, wherein said brushes mechanism comprises a plurality of low friction brushes and a plurality of conductive rings.

30. The method of claim 12 comprising controlling the magnetic field of the AC generator so as to maintain a peak voltage of the AC output signal substantially constant despite changes in the rotation speed.

31. A system for providing an alternating current (AC) voltage, the system comprising:

an AC generator that outputs an AC output signal and comprises an AC rotor that communicates with a shaft that rotates at a rotation speed;

a speed sensor for sensing the rotation speed; and a controller for controlling a magnetic field of the AC generator in response to the rotation speed; wherein the controller comprises a Field Exciter that provides a current that is provided to the AC generator so as to control the magnetic field of the AC generator; wherein said Field Exciter comprises a brushes mechanism; the system further comprising a mechanical input element for rotating the shaft that is powered by a variable power source, said variable power source causing changes in the rotation speed of the shaft.

32. The system of claim 31, wherein said brushes mechanism comprises a plurality of low friction brushes and a plurality of conductive rings.

* * * * *